United States Patent [19]

Dolla

[11] Patent Number: 5,090,774
[45] Date of Patent: Feb. 25, 1992

[54] ACOUSTICALLY DECOUPLED UNDERBODY FOR A MOTOR VEHICLE

[75] Inventor: Franz Dolla, Isenbüttel, Fed. Rep. of Germany

[73] Assignee: Volkswagen AG, Wolfsburg, Fed. Rep. of Germany

[21] Appl. No.: 586,449

[22] Filed: Sep. 21, 1990

[30] Foreign Application Priority Data

Sep. 21, 1989 [DE] Fed. Rep. of Germany ....... 3931493

[51] Int. Cl.$^5$ ............................................. B62D 21/00
[52] U.S. Cl. ................................. 296/188; 296/35.2; 296/190; 296/193; 296/204
[58] Field of Search ............... 296/187, 188, 189, 190, 296/193, 194, 196, 197, 203, 204, 209, 35.1, 35.2

[56] References Cited

U.S. PATENT DOCUMENTS 3,791,472  2/1974  Tatsumi .......................... 296/204 X

FOREIGN PATENT DOCUMENTS 0233505  1/1987  European Pat. Off. .
2145467  4/1973  Fed. Rep. of Germany ...... 296/204

Primary Examiner—Margaret A. Focarino
Assistant Examiner—Andrew C. Pike
Attorney, Agent, or Firm—Brumbaugh, Graves, Donohue & Raymond

[57] ABSTRACT

An underbody for a motor vehicle has side rails with inclined portions and parallel sills and a floor panel joined by a transverse support arrangement which is spaced apart from the side rails for acoustic decoupling. In order to form positive interlocks in the case of a crash-induced offset of the inclined side rail portions, the transverse support arrangement has projections that become engaged in corresponding recesses in stiffening plates attached to the inclined side rail portions.

2 Claims, 2 Drawing Sheets

ACOUSTICALLY DECOUPLED UNDERBODY FOR A MOTOR VEHICLE

BACKGROUND OF THE INVENTION

The present invention relates to an acoustically decoupled underbody and passenger compartment for a motor vehicle and, more particularly, to an underbody having improved crash resistance as well as acoustic isolation of the passenger compartment.

German Offenlegungschrift No. 2,145,467 discloses a motor vehicle having a pair of side rails, a pair of sills displaced outwardly from the side rails and running parallel to them, and a floor panel having inclined front regions. Each of the side rails has an inclined portion toward the front with a provision for spacing them from the inclined front regions of the floor panel to provide acoustic decoupling of the passenger compartment.

Except for torsion pads provided between the front ends of the sills and the side rails, the sills are supported from the side rails essentially only in the area of their rear end regions. This support is by way of a transverse connection between the side rails and the floor panel. It is well known that vibrations coming from the front of the car may lead to the development of disturbing noises and rattles in the passenger compartment. Because a space is maintained between the side rails and the floor panel, direct transfer of vibration from the front of the vehicle containing the engine is avoided in order to minimize noise and rattles in the passenger compartment.

SUMMARY OF THE INVENTION

Accordingly, it is an object of the present invention to provide a new and improved underbody for a motor vehicle which provides both improved acoustic decoupling and improved crash characteristics.

An acoustically decoupled underbody for a motor vehicle comprises on each side of the longitudinal axis of the vehicle a side rail that is spaced apart from and substantially parallel to the longitudinal axis of the vehicle and has an inclined portion, the inclined portion of the side rail having an upper surface. A sill is located outwardly of the side rail, relative to the longitudinal axis of the vehicle, the sill being oriented substantially parallel to the side rail. A floor panel having an inclined portion is located above and in spaced-apart relation to the inclined portion of the side rail. A transverse support arrangement, which is connected to the sill and to the inclined portion of the floor panel, overlies the inclined portion of the side rail and is spaced apart from the inclined portion of the side rail. The transverse support arrangement has a projection extending toward the inclined portion of the side rail, and the inclined portion of the side rail has a depression corresponding to the projection. The projection normally is spaced apart from the depression but is engageable with the depression upon a crash-induced offset of the inclined portion of the side rail such as to form a locking connection between the inclined portion of the side rail and the transverse support arrangement.

In a preferred embodiment, a stiffening plate is fastened to the upper surface of the inclined portion of the side rail, and the depression is in the stiffening plate.

A particular advantage of the invention is that, despite an improved crash characteristic resulting from engagement of a displaced side rail with a transverse support surface, no acoustic connection exists between the side rails and the front of the passenger compartment during normal operation of the vehicle because of the absence of contact between the side rails and the floor panel.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
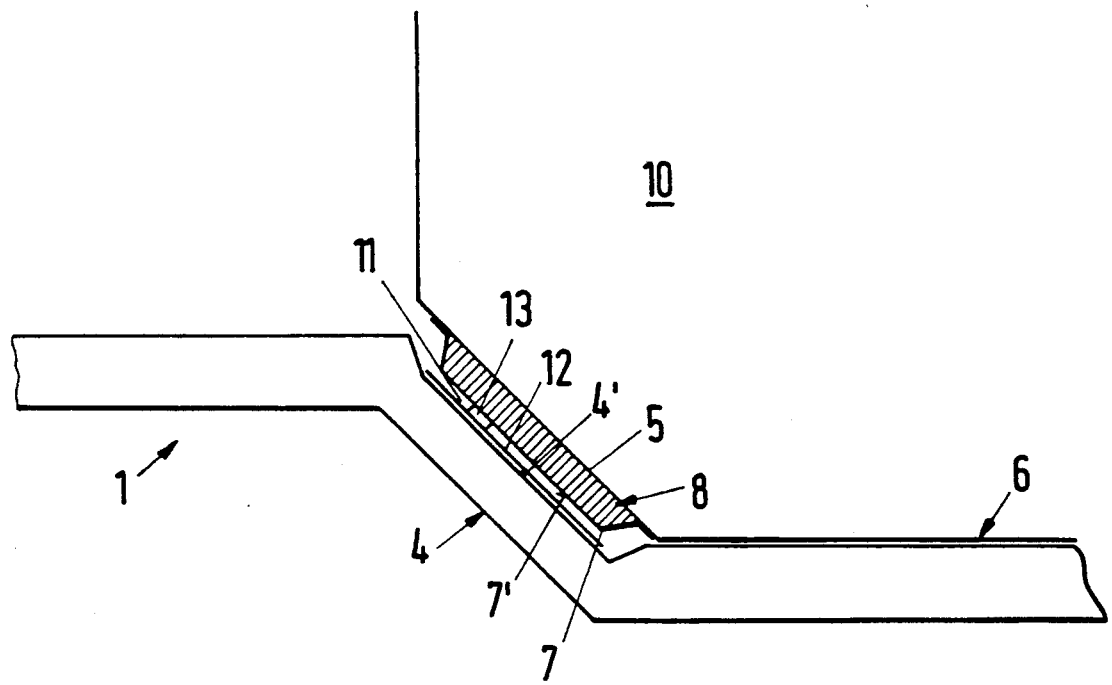
FIG. 1 is a fragmentary view in longitudinal section, taken along the line I—I of FIG. 2, showing a representative side rail and transverse support arrangement in accordance with the invention on the left side of the vehicle and is also a mirror image of a side rail and transverse support arrangement on the right side of the vehicle
Figure 2:
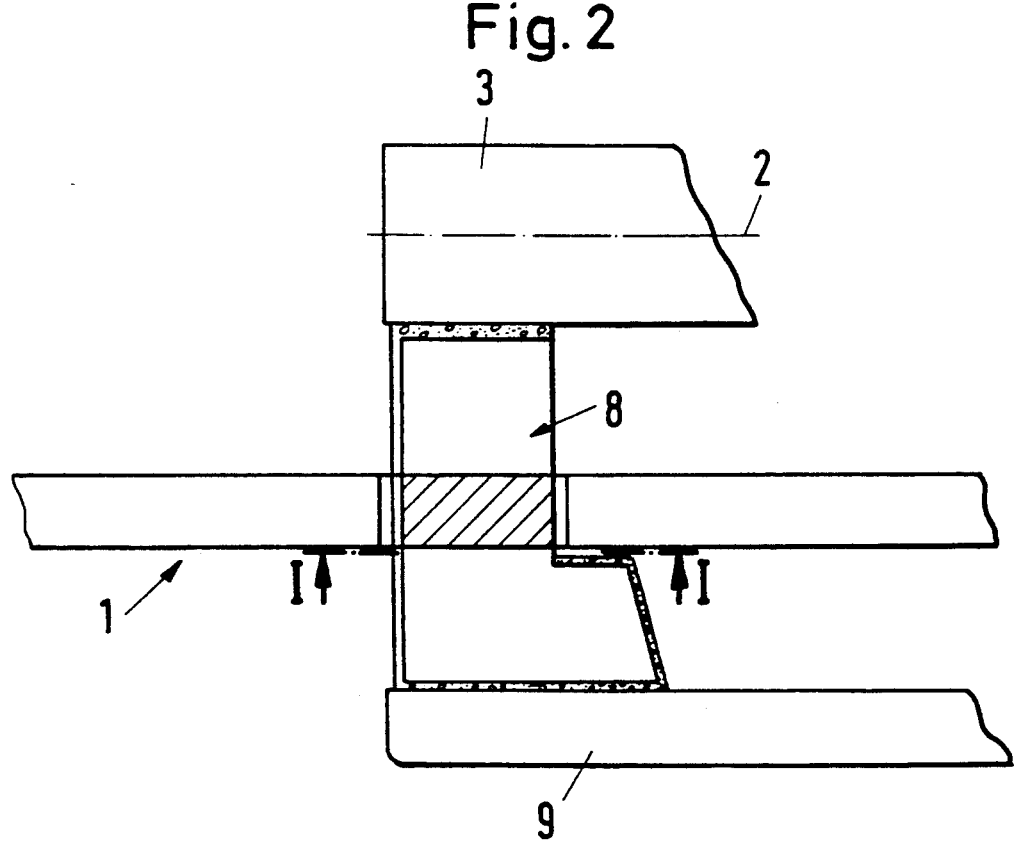
FIG. 2 is a fragmentary top view of the portion of the underbody on the left side of the vehicle shown in FIG. 1 and is also a mirror image of a portion of the underbody on the right side of the vehicle.
Figure 3:
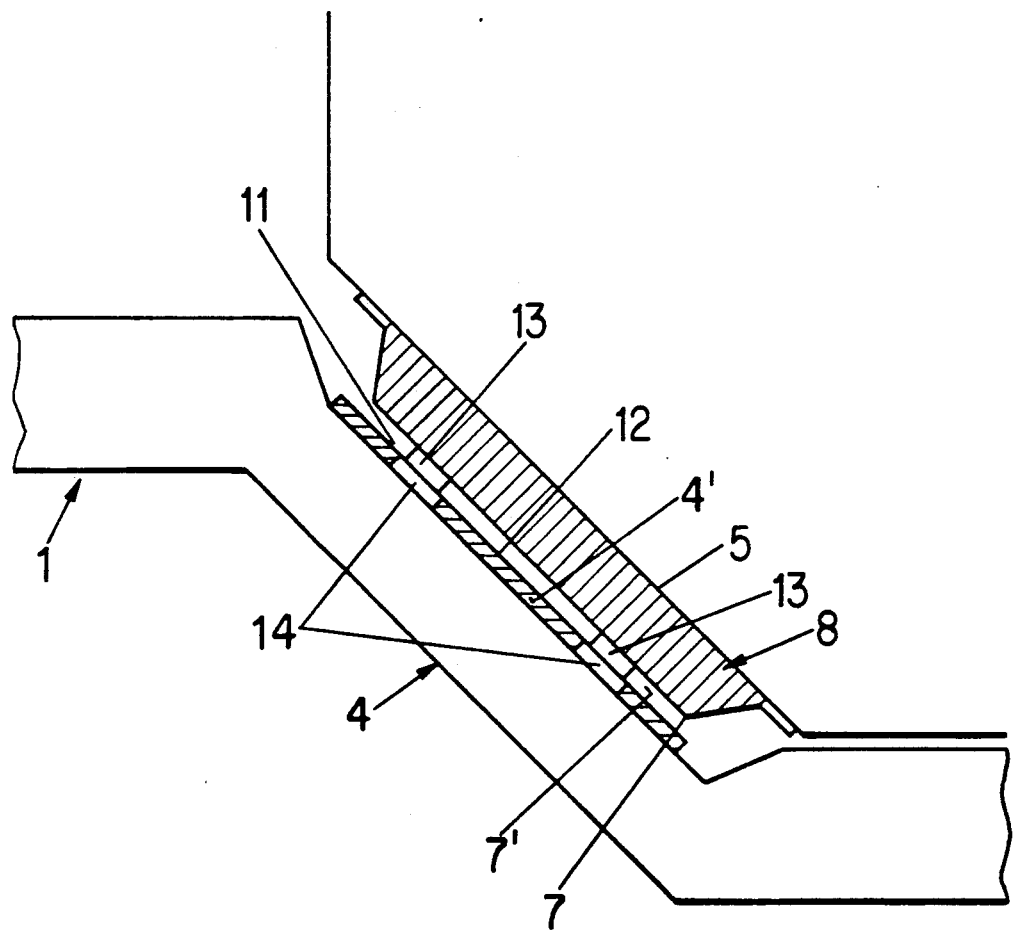
FIG. 3 is an enlarged fragmentary view of a portion of the structure shown in FIG. 1.

In the representative underbody arrangement shown in FIGS. 1 and 2, only one side rail 1 for one side of the vehicle is shown. It will be understood that the underbody is symmetrical about the longitudinal axis 2 of the vehicle so that a second side rail is present on the other side of a central tunnel 3. Since the other side rail has the same design as the side rail 1 and FIGS. 1 and 2 are mirror images of the right side of the underbody, illustration is not necessary.

As illustrated in FIG. 1, the side rail 1 has an inclined portion 4 disposed under an inclined region 5 of a floor panel 6 of a vehicle passenger compartment 10. The floor panel inclined region 5 is attached to a closed transverse support arrangement 8 having an inclined transverse profile 7 adjacent to the inclined side rail portion 4. The transverse support arrangement 8 extends between the aforementioned central tunnel 3 and a sill 9 shown in FIG. 2. The sill 9 and the corresponding sill on the opposite side of the vehicle (not shown) runs parallel to the adjacent side rail 1 and is displaced toward the outside of the vehicle. Moreover, the front of the sill 9 ends in the region of the transverse support arrangement 8 described above.

In order to prevent the transfer of sound from the side rails 1, which also serve to support the motor of the vehicle, to the passenger compartment 10 and to the floor panel, a space 11 is maintained between the upper surface 4' of the inclined side rail portion 4, and the adjacent facing surface 7' of the transverse profile 7 of the transverse support arrangement 8. The two side rails 1 are connected at their rear ends by way of, for example, additional transverse supports for the sills (not shown) and, if desired, by further transverse connections (not shown) behind the inclined regions 5 of the floor panel 6.

It will be understood that the space 11 between the side rails 1 and the transverse supports 8 reduces the structural integrity of the underbody in the case of a frontal impact which forces the side rails 1 into the sills 9 and the floor panel 6, causing an undesired buckling of the passenger compartment. In order to prevent this loss of structural integrity under frontal impact in accordance with the invention, there is provided not only an attachment of the floor panel at the inclined base region 5 to the transverse support arrangement 8, but, in addition, the adjacent facing surfaces 4' and 7' defining the space between those members are arranged to form locking connections in the event of crash-induced offsets in the inclined side rail portion 4. For this purpose, the inclined side rail portion 4 is provided with a stiffening plate 12 which has depressions or recesses 14 to receive corresponding projections 13 on the transverse support arrangement 8. The projections 13, for example, may be normally disposed within the depressions or recesses in the side rail portion 4 but in that case care must be exercised to see that there is no contact between the projection and the stiffening plate 12 in normal operation of the vehicle.

Alternatively, the projections and recesses may be arranged so that the projections enter the recesses only when a crash-induced offset of the side rail region 4 has occurred. In either case, application of forces from the side rail 1 to the transverse support arrangement 8 and from the latter to the sill 9 and the tunnel 3 in the event of a crash is ensured by the stiffening plate 12.

Positive interlocking of the projections and corresponding depressions may, of course, be produced in some other way, for example, by suitable design of the facing surfaces of the inclined side rail portions 4 and of the transverse support arrangement 8 so that these surfaces can become engaged with each other in the event of a collision.

Thus, the invention provides an underbody which, while assuring favorable acoustic behavior, is effective to transfer force from the side rails into the other regions of the underbody in the event of a crash.

Although the invention has been described herein with reference to specific embodiments, many modifications and variations therein will readily occur to those skilled in the art. Accordingly, all such variations are included within the scope of the invention.

I claim:

1. An acoustically decoupled underbody for a motor vehicle having a longitudinal axis comprising a side rail that is spaced apart from and substantially parallel to the longitudinal axis of the vehicle and has an inclined portion, the inclined portion of the side rail having an upper surface; a sill located outwardly of the side rail relative to the longitudinal axis of the vehicle and oriented substantially parallel to the side rail; a floor panel having an inclined portion located above and in spaced-apart relation to the inclined portion of the side rail; and a transverse support arrangement that is connected to the sill and to the inclined portion of the floor panel and overlies the inclined portion of the side rail and is spaced apart from the inclined portion of the side rail, the transverse support arrangement having a projection extending toward the inclined portion of the side rail and the inclined portion of the side rail having a depression corresponding to the projection, and the projection normally being spaced apart from a bottom of the depression.

2. An acoustically decoupled underbody for a vehicle according to claim 1 and further comprising a stiffening plate fastened to the upper surface of the inclined portion of the side rail and wherein the depression is in the stiffening plate.

* * * * *